United States Patent [19]

Schindling

[11] 4,076,044
[45] Feb. 28, 1978

[54] LOCK CHAMBER FOR DISCHARGING DUST

[75] Inventor: Josef Franz Schindling, Frankfurt-Unterliederbach, Germany

[73] Assignee: Metallgesellschaft Aktiengesellschaft, Frankfurt am Main, Germany

[21] Appl. No.: 726,487

[22] Filed: Sep. 24, 1976

[30] Foreign Application Priority Data

Sep. 30, 1975 Germany .............................. 2543523

[51] Int. Cl.² .......................... G01F 11/42; F16K 5/00
[52] U.S. Cl. ............................... 137/614.11; 222/452; 251/313
[58] Field of Search ...................... 137/614.11, 614.13, 137/612.1; 251/304, 313, 337; 222/452; 302/62; 209/150, 152

[56] References Cited

U.S. PATENT DOCUMENTS

| | | | |
|---|---|---|---|
| 1,148,830 | 8/1915 | Cratty et al. | 251/313 X |
| 1,257,816 | 2/1918 | Cunnyngham | 137/614.11 X |
| 1,783,264 | 12/1930 | Sirotek | 137/614.11 X |
| 3,260,415 | 7/1966 | Minamiyama et al. | 222/452 X |

Primary Examiner—Edgar W. Geoghegan
Attorney, Agent, or Firm—Karl F. Ross

[57] ABSTRACT

A lock chamber for discharging dust from an apparatus at an elevated pressure to a low-pressure space, e.g. from an electrostatic separator or cyclone separator at high pressure to a collector or bin at atmospheric pressure, comprises a chamber having an upper inlet and a lower outlet opening and a rotary valve member having a window and adapted, upon rotation, to selectively block and unblock the openings alternately so that pressure is maintained in the high-pressure apparatus while dust can be discharged from the chamber.

7 Claims, 4 Drawing Figures

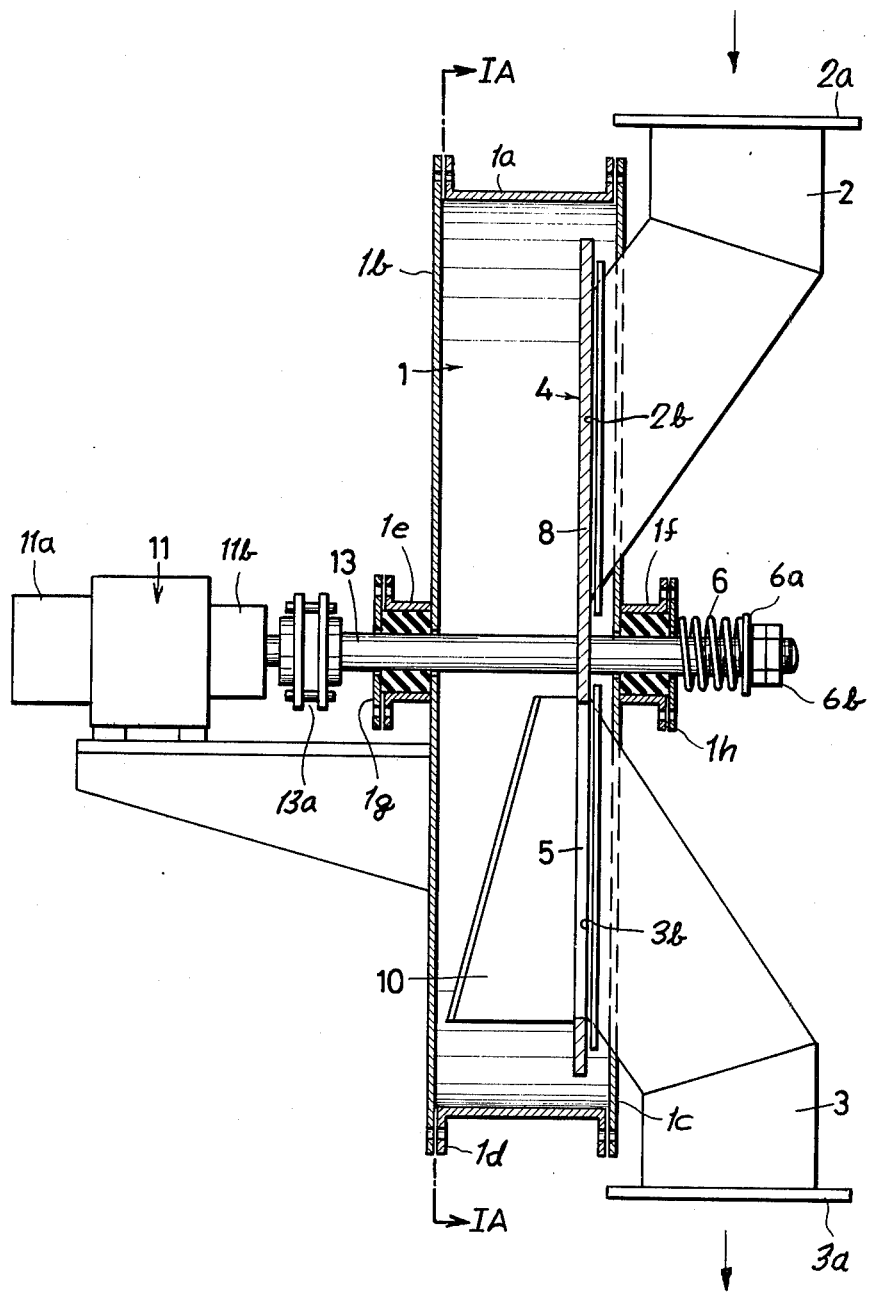

LOCK CHAMBER FOR DISCHARGING DUST

FIELD OF THE INVENTION

The present invention relates to a lock chamber and, more particularly, to a device for discharging dust by gravity from a pressurized system.

BACKGROUND OF THE INVENTION

Lock-chamber devices are generally required in installations for separating dust from gases which are under a high pressure than the space into which the dust is to be discharged. Installations of this type include electrostatic separators, cyclones and other systems having bins maintained at an elevated pressure from which the dust is to be discharged into a collector at atmospheric pressure.

If such systems are provided with flap-type outlets which are intermittently opened to the low-pressure space, gas at high velocity tends to escape and will entrain and agitate the dust in an undesirable manner.

An escape of gas itself is undesirable because it constitutes an unavoidable loss of the gas or is ecologically intolerable, especially when the low-pressure space is the atmosphere. For this reason the the dust must be discharged from such pressurized systems through lock chambers.

So-called "starwheel" lock chamber devices are known and comprise a starwheel disposed in a cylindrical housing which, together with the wall of the housing, defines a plurality of revolving cells which can be filled with dust through an inlet connected to the housing and from which the dust can be discharged through an outlet.

The number and arrangement of the blades of the starwheel are so selected as to preclude any direct communication from the inlet to the outlet. In other words, any cell communicating with the inlet does not simultaneously communicate with the outlet but only opens into the latter after it has been removed from alignment with the inlet.

Such starwheel lock chambers require a good seal between the rotating starwheel and the housing wall if effective removal of dust without discharge of gas or reduction of the pressure at the inlet is to be obtained.

Because the dust often contains hard components, which subject all materials to strong abrasion, the sealing surfaces of the starwheel lock chamber are subjected to heavy wear. In addition the starwheel must be virtually sealed throughout the periphery of the lock chamber so that the provision of resilient means to maintain a pressure contact between the sealing surfaces and compensate for wear, even to a limited extent, involves high structural expense.

As an alternative to starwheel lock chambers, so-called "swinging gate" lock chambers have been proposed, the latter enabling the filling of a separate lock chamber with dust and a discharge of the dust from the lock chamber in an intermittent operation. Where the pressure differentials across the system are high, the dust-discharge opening of such devices must be relatively small because the means for actuating the gate would otherwise have to be of high capacity. Furthermore, openings of a certain size are required if dust is to be collected at a given rate. These mutually contradictory requirements preclude the devices which have been proposed from being used in all conceivable applications requiring maintenance of pressure at the inlet to the lock chamber.

OBJECTS OF THE INVENTION

It is the principal object of the present invention to provide a lock chamber device for discharging dust from a pressurized system which is as universal as possible in application and yet avoids the disadvantages of the known arrangements.

Another object of the invention is to provide a highly effective lock chamber which is less susceptible to abrasive wear and provides more effective sealing than conventional lock chambers, is of low capital and maintenance cost, and has high throughput.

SUMMARY OF THE INVENTION

These objects are attained, in accordance with the present invention, by the provision of a lock chamber which comprises a housing forming the chamber proper and having an inlet opening at an upper level and an outlet opening at a lower level, preferably directly below the inlet opening, and a rotary valve member disposed in the chamber and adapted to cover and seal the inlet and outlet openings. The rotary valve member has a throughgoing passage which can be selectively aligned with the two openings so that they can be caused to communicate, through the passage or window in the rotary valve member, with the interior of the chamber.

According to a feature of the invention, the rotary valve member is forced against the openings by prestressed resilient means. To facilitate the manufacture of the lock chamber according to the invention, the rotary valve member may consist of a flat disk, the openings from the inlet and outlet lying in a plane parallel to the disk and against which the disk is urged.

For other applications and in accordance with another feature of the invention the rotary valve member may consist of a conical body.

Dust can be particularly effectively discharged if a spiral scoop is provided on the surface of the rotary valve member opposite that at which the openings are located.

The means for driving the rotary valve member are most advantageously arranged outside the chamber or housing and preferably are designed to permit selectively a continuous or intermittent operation of the valve member. To this end, the means can drive a shaft which extends through the chamber wall and is sealed relative thereto by a gas-type sealing arrangement.

In a particularly preferred arrangement of the invention, the prestressed resilient means, e.g. a coil spring or a stack of belleville washers or dish-disk springs, are disposed outside the chamber and the force by which the rotary valve member is urged against the plane of the openings is transmitted to this member by the shaft which extends through the chamber wall. If the spring means is located at the end of the shaft opposite that at which the motor to drive means is disposed, this end of the shaft can also pass through the chamber wall and can be sealed relative thereto by a sealing arrangement.

In the simplest embodiment of the present invention, in which the rotary valve member consists of a flat disk, the device according to the invention is structurally simple and particularly rugged as is desired for its intended purpose. It should be emphasized that the surfaces to be sealed are much smaller than in a starwheel lock chamber device and the sealing surfaces can be urged particularly conveniently and with very simple means against one another so as to compensate for wear.

The device according to the invention can be operated continuously or intermittently as suggested above. During continuous operation, the passage provided in the rotary valve member advances slowly along a circular path and during an angular movement in a freely selected range exposes the dust inlet so that the chamber is filled with dust. The latter is conveyed under the effect of gravity and any pressure differential acting in the same sense into the chamber. The dust outlet remains closed as long as the inlet opening is exposed or aligned with the passage.

As a result, the pressure in the chamber is the same during this phase as the pressure in the pressurized system.

As the rotation of the valve member continues, the dust inlet is closed before the passage in the rotary valve member communicates with and is exposed to the dust outlet. The dust then flows out of the chamber into the space outside the chamber under the effect of gravity and any residual pressure in the chamber acting in the same sense.

According to another feature of the invention, the discharge of the dust is further improved by providing a spiral scoop on the rear surface of the rotary valve member, i.e. on the side thereof opposite that at which the openings of the inlet and outlet are disposed. The spiral scoop rotates with the valve member and lifts the dust from the lower portion of the chamber to a certain extent and assists in advancing the dust outwardly through the passage and the outlet.

BRIEF DESCRIPTION OF THE DRAWING

The above and other objects, features and advantages of the present invention will become more readily apparent from the following description, reference being made to the accompanying drawing in which:

FIG. 1 is a partial sectional view (in vertical axial cross section) showing a lock chamber device according to the invention;

SPECIFIC DESCRIPTION

Figure 1A:
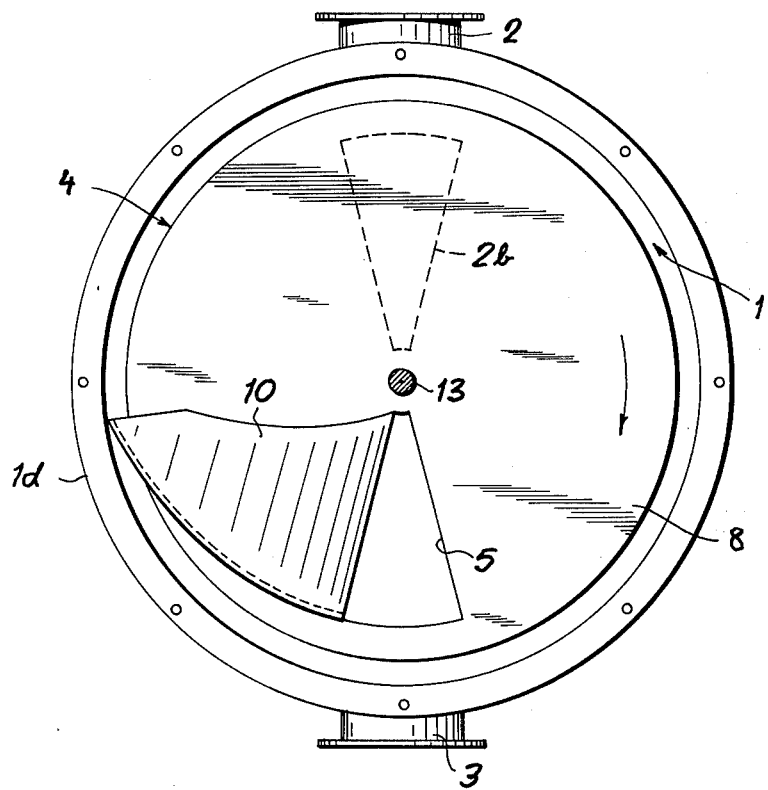
FIG. 1A is a cross-sectional view taken along the line IA—IA of FIG 1, drawn to a smaller scale.

In FIG. 1 I have shown a lock chamber device according to the invention which comprises a rotary valve member 4 in the form of a flat disk 8 provided with a throughgoing opening 5. The valve member 4 is mounted on a shaft 13 which is biased axially by a coil spring 6 to the right. To this end, the coil spring 6 bears at one end against a plate 1h closing a packing seal 1f of the rear wall 1c of the housing which sealingly receives the shaft 13. The other end of spring 6 rests against a washer 6a mounted on the shaft 13 and held in place by locking nuts 6b. The spring 6 urges the disk 8 against the inlet opening 2b and the outlet opening 3b of the pair of ducts 2 and 3 respectively forming the inlet and outlet conduits. These ducts pass through the wall 1c and have their openings in a plane perpendicular to the axis of shaft 13.

The disk 8 is rotatable as represented by the arrow in FIG. 1A to move the opening 5 selectively into registry with one or the other of the openings 2b, 3b of the dust conduits 2, 3. When the opening 5, which is at the higher level exposes or communicates with the dust-containing space, the chamber 1 within the housing communicates with the pressurized system and dust from the system is permitted to enter the chamber 1.

When the opening 5 is subsequently moved into registry with the dust outlet opening, disposed at a lower level, dust falls from the chamber 1, e.g. into a collecting bin, which is disposed beneath the conduit 3 and may be at atmospheric pressure.

The discharge of the dust is improved when the rotary valve member 4 and specifically the disk 8 is provided on its side opposite the plane of the openings with a spiral scoop 10 best seen in FIG. 1A. During rotation of this scoop in the sense indicated by the arrow, the scoop carries the dust toward the outlet opening and facilitates its discharges.

The rotary valve member 4 may be continuously or intermittently driven by a drive means represented at 11. More particularly, the drive means may include an electric motor 11a having speed-reducing gearing 11b connected to the shaft 13 by a coupling 13a. The chamber 1 is closed by a wall 1b through which the shaft 13 extends via a packing seal 1e closed by a plate 1g. The cover 1b is connected to the cylindrical housing portion 1a by a flanged connection 1d, a similar connection being used to attach the cylindrical housing portion 1a to the rear will 1c of the chamber.

Flanges 2a and 3a serve to connect the conduits 2 and 3 to the high-pressure installation and the bin, respectively.

Figure 2A:
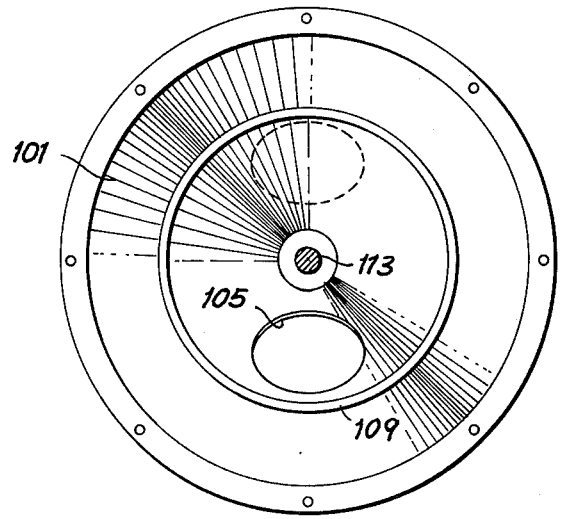
FIG. 2A is a cross-sectional view taken along the line IIA—IIA of FIG. 2 but drawn to smaller scale.
Figure 2:
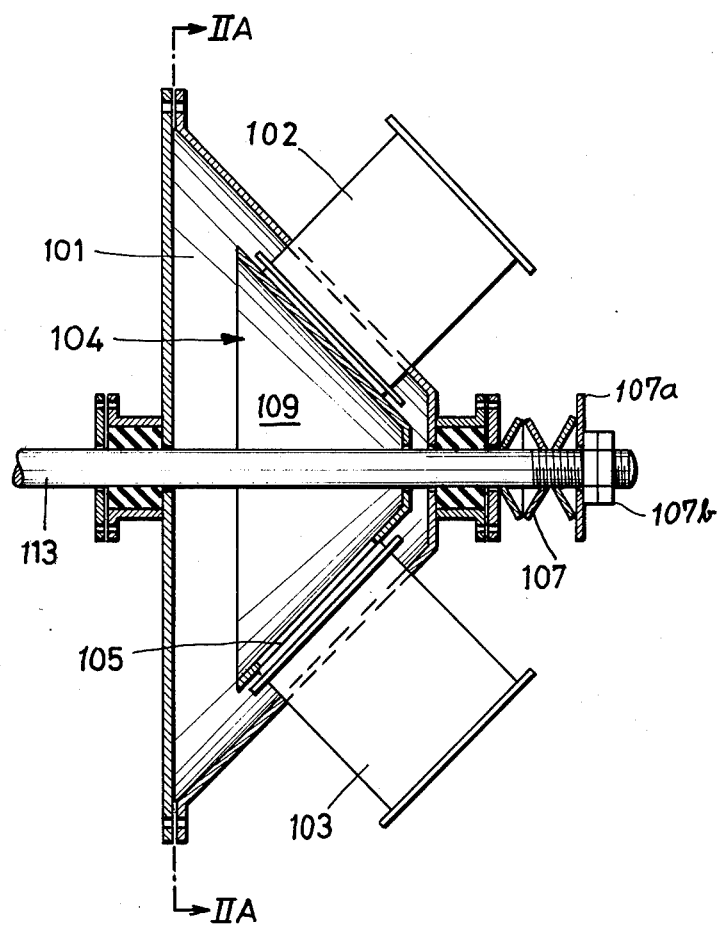
FIG. 2 is a view similar to FIG. 1 of a system in which the rotary valve member is of conical configuration.

FIGS. 2 and 2A show a rotary valve member 104 having a conical body 109 which conforms in shape to that of the chamber 101. In this embodiment, the means for biasing the shaft 113 to the right, thereby urging the valve member 104 against the openings of the inlet conduit 102 and the outlet conduit 103, consists of a stack of dish-disk springs or belleville washers 107, rather than a coil spring. The stack bears against a planar washer 107a resting against nuts 107b threaded onto the shaft 113. The latter can be driven by a geared motor as shown at 11 in FIG. 1.

An opening 105 in the conical body 109 serves again to selectively communicate with one of the openings of the conduits 2, 3, respectively.

The invention is also applicable to lock chamber dervices in which the inlet opening and outlet opening of conduits 2, 3 and 102, 103 cannot be arranged directly one above the other for structural reasons.

Thus the two openings may be angularly offset at, say, 120° C, rather than 180° as shown, about the axis of the shaft and it is even possible to dispose the two openings at the same level and to rely upon the pressure of the high-pressure installation or the force of gravity to fill the chamber, whereupon discharge is effected either by gravity alone or is assisted by a scoop such as has been illustrated in FIGS. 1 and 1A.

I claim:

1. A lock chamber device for discharging dust by gravity from a pressurized system, comprising:
   housing means forming a chamber;
   an inlet opening communication with said system and having an opening into said chamber;
   an outlet opening from said chamber at a location spaced from said inlet;
   a rotary valve member disposed in said chamber and provided with a throughgoing passage selectively alignable with said inlet and outlet openings whereby only one of said openings can communicate with the interior of said chamber at any time; and prestressed resilient means urging said valve member against said openings, said valve member consisting of a flat disk, said openings lying in a common vertical plane perpendicular to the axis of rotation of said valve member said inlet opening being disposed directly above said outlet opening.

2. A lock chamber device for discharging dust by gravity from a pressurized system, comprising:
housing means forming a chamber;
an inlet opening communicating with said system and having an opening into said chamber;
an outlet opening from said chamber at a location spaced from said inlet;
a rotary valve member disposed in said chamber and provided with a throughgoing passage selectively alignable with said inlet and outlet openings whereby only one of said openings can communicate with the interior of said chamber at any time; and
prestressed resilient means urging said valve member against said openings, said valve member comprising a conical shell, said openings lying along an imaginary conical surface centered on the axis of rotation of said valve member with said inlet opening disposed directly above said outlet opening.

3. A lock chamber device for discharging dust by gravity from a pressurized system, comprising:
housing means forming chamber;
an inlet opening communicating with said system and having an opening into said chamber;
an outlet opening from said chamber at a location spaced from said inlet;
a rotary valve member disposed in said chamber and provided with a throughgoing passage selectively alignable with said inlet and outlet openings whereby only one of said openings can communicate with the interior of said chamber at any time, and
prestressed resilient means urging said valve member against said openings, said valve member being provided on a side thereof opposite that at which said openings are provided with a spiral scoop effecting the discharge of dust through the outlet opening.

4. The device defined in claim 3, further comprising drive means operatively connected to said member for rotating same and disposed externally of said housing, said valve being mounted on a shaft driven by said drive means and passing through a wall of said housing, said valve being mounted on a shaft driven by said drive means and passing through a wall of said housing, said valve being mounted on a shaft driven by said drive means and passing through a wall of said housing, said device including a seal on said wall surrounding said shaft.

5. The device defined in claim 4 wherein said prestressed resilient means includes a spring disposed outside said housing and bearing against said shaft.

6. The device defined in claim 5 wherein said spring engages said shaft on an end thereof opposite said drive means and extending through another wall of said housing, said other wall of said housing being provided with a further seal surrounding said shaft.

7. The device defined in claim 3, wherein said resilient means includes a spring disposed externally of said housing, said member being mounted on a shaft extending through a wall of said housing and said spring bearing axially on said shaft, said wall of said housing being provided with a seal surrounding said shaft.

* * * * *